(12) United States Patent
Biel et al.

(10) Patent No.: US 9,033,386 B2
(45) Date of Patent: May 19, 2015

(54) GRIPPER FOR A CONTACT LENS AND PROCESS FOR TRANSPORTING A CONTACT LENS

(71) Applicant: Novartis AG, Basel (CH)

(72) Inventors: Roger Biel, Aschaffenburg (DE); Günter Lässig, Obernburg (DE); Michael Wolf, Darmstadt (DE); Fabian Kern, Amorbach (DE)

(73) Assignee: Novartis AG (CH)

( * ) Notice: Subject to any disclaimer, the term of this patent is extended or adjusted under 35 U.S.C. 154(b) by 0 days.

(21) Appl. No.: 14/445,695

(22) Filed: Jul. 29, 2014

(65) Prior Publication Data
US 2014/0346795 A1 Nov. 27, 2014

Related U.S. Application Data

(62) Division of application No. 12/873,342, filed on Sep. 1, 2010, now Pat. No. 8,801,066.

(60) Provisional application No. 61/239,889, filed on Sep. 4, 2009.

(51) Int. Cl.
*B25J 15/06* (2006.01)
*B29D 11/00* (2006.01)
*B65G 47/91* (2006.01)

(52) U.S. Cl.
CPC ......... *B25J 15/0658* (2013.01); *B29D 11/0024* (2013.01); *B65G 47/91* (2013.01)

(58) Field of Classification Search
USPC ........ 294/1.2, 183, 185, 186, 188, 64.3, 902; 206/1.5, 5.1; 606/107; 269/21; 901/40
See application file for complete search history.

(56) References Cited

U.S. PATENT DOCUMENTS

| | | | |
|---|---|---|---|
| 3,134,208 A * | 5/1964 | Richmond | 269/21 |
| 3,791,689 A * | 2/1974 | Boone et al. | 294/187 |
| 4,286,815 A * | 9/1981 | Clark | 294/1.2 |
| 5,069,494 A | 12/1991 | Reinson | |
| 5,169,196 A * | 12/1992 | Safabakhsh | 294/64.3 |
| 5,324,087 A | 6/1994 | Shimose | |
| 5,572,785 A * | 11/1996 | Tveit | 294/183 |

(Continued)

FOREIGN PATENT DOCUMENTS

| | | |
|---|---|---|
| EP | 1029789 A2 | 8/2000 |
| EP | 1650128 A1 | 4/2006 |
| WO | 03080320 A1 | 10/2003 |

OTHER PUBLICATIONS

PCT International Search Report dated Dec. 6, 2010 for International Application No. PCT/EP2010/062821, International Filing Date Sep. 1, 2010.

(Continued)

*Primary Examiner* — Paul T Chin
(74) *Attorney, Agent, or Firm* — Robert A. Ambrose

(57) ABSTRACT

A gripper (1) for a contact lens (CL) includes a gripper head (10) having a bearing surface (11), the bearing surface (11) having at least one opening (110) through which underpressure can be applied in order to suck the contact lens (CL) against the bearing surface (11) and through which overpressure can be applied in order to release the contact lens (CL) from the bearing surface (11). The gripper further includes a detection opening (111) in the bearing surface (11) through which a separate underpressure can be applied.

11 Claims, 3 Drawing Sheets

(56) References Cited

U.S. PATENT DOCUMENTS

| | | |
|---|---|---|
| 6,494,021 B1 | 12/2002 | Schlagel |
| 6,502,876 B1 * | 1/2003 | Stockhorst et al. ........... 294/183 |
| 6,994,386 B2 * | 2/2006 | Hagmann et al. ............. 294/188 |
| 8,387,782 B2 | 3/2013 | Biel |
| 8,801,067 B2 * | 8/2014 | Lassig et al. ................. 294/183 |
| 2003/0178862 A1 | 9/2003 | Hagmann |
| 2012/0126558 A1 | 5/2012 | Lässig |

OTHER PUBLICATIONS

PCT Written Opinion of the International Searching Authority dated Dec. 6, 2010 for International Application No. PCT/EP2010/062821, International Filing Date Sep. 1, 2010.

* cited by examiner

GRIPPER FOR A CONTACT LENS AND PROCESS FOR TRANSPORTING A CONTACT LENS

This application is a division of U.S. patent application Ser. No. 12/873,342, filed Sep. 1, 2010 which claims the benefit under 35 U.S.C. §119 (e) of U.S. provisional Application No. 61/239,889, filed on Sep. 4, 2009, each of which is incorporated by reference in its entirety.

FIELD

The invention relates to a gripper for a contact lens and to a process for transporting a contact lens.

BACKGROUND

In the automated production of contact lenses in general, but especially in the production of large batches of contact lenses, as is the case for example with disposable lenses, it is necessary, at certain stations in the production process, to be able to manipulate the contact lenses safely, quickly and efficiently. An example of such manipulation of a contact lens is when the contact lens is removed from a test cell in which said contact lens has been placed in a liquid, for example in water, in order to test it (e.g. by image processing).

To remove the tested contact lens from such a test cell, devices called grippers are used, as are also used at other stations in such a production process. The contact lens is gripped with the aid of such a gripper and, in the example described above, is removed from the test cell. The contact lens is then deposited for example into a receptacle which can be part of the final package for the contact lens and into which a storage solution (e.g. saline) is dispensed. The receptacle is then welded or sealed with a cover foil, and, after subsequent autoclaving, the final package can be released for distribution.

In the above-described removal of the contact lens from the test cell and the subsequent dispensing of the contact lens into the receptacle in which the saline is present, care must be taken to ensure that only a very small amount of water, preferably none at all, is entrained with the contact lens, otherwise the saline is getting diluted and its osmolarity is changed. This is a problem which is not at all easy to solve, because the contact lens in the above-mentioned test cell has to be sucked from "under water" (with the result that water is necessarily also sucked out with the lens), then transported to the receptacle which is part of the final package, and finally deposited in this receptacle, for which purpose the contact lens has to be released again from the gripper. In addition, the contact lens has to be gripped securely by the gripper (even "under water"), and in the case of small receptacles the contact lens has to be reliably deposited centrally in the receptacle so that it is not later damaged by the cover foil during the welding or sealing of the receptacle.

A gripper suitable to fulfill these requirements is shown in WO 03/080320. The gripper shown there is capable of reliably gripping a contact lens, if appropriate even "under water", and at the same time ensures that the amount of liquid (e.g. water) entrained is very small (e.g. less than approximately 40 microliters). Also, with this gripper the contact lens can be reliably deposited centrally in a receptacle. As can also be seen, the gripper shown in WO 03/080320 has a plurality of openings in the bearing surface through which suction can be applied, in particular the gripper has a central opening and a plurality of additional openings arranged on an arc of a circle about the central opening. The central opening and each additional opening are connected through respective grooves provided in the bearing surface. The respective groove connecting the central opening with one of the additional openings extends radially outwards beyond the respective additional opening. As underpressure or suction is applied, the contact lens is sucked and adheres to the bearing surface. In addition, water is also sucked up. In case water is trapped between the contact lens and the bearing surface, such water can pass through the grooves to the openings and from there into the interior of the gripper where it will be sucked into the tube through which the underpressure is applied and is transported away. In case no water is entrapped between the contact lens and the bearing surface or the entrapped water has already been sucked into the tube air is sucked through these channels and openings.

This may sometimes lead to an unwanted drying of the contact lens particularly in the region near the lens edge, which is a crucial region for the wearing comfort. In addition, depending on how the production process is built up it would be desirable to know whether or not a lens has been successfully sucked and adheres to the bearing surface of the gripper head. Moreover, when a contact lens has been successfully sucked and has been transported to its destination location, e.g. to the location where it is intended to be placed into the receptacle of the package, it would later on be desirable to know whether the lens has been successfully released from the bearing surface. Although in the packaging line a separate contact lens presence check may be performed, it may occur that a contact lens has not been released from the gripper despite the application of overpressure thus resulting in a package not containing a lens, so that this package and any additional packages connected thereto must be sorted out and cannot be distributed. In addition, when the gripper has not successfully released the contact lens and subsequently returns to its starting position to grip (suck) another contact lens, it may be unable to grip the next contact lens since the previously gripped contact lens still adheres to the bearing surface. Therefore, it would be desirable to have a clear indication whether or not a contact lens has been successfully sucked and adheres to the bearing surface on one hand and has later on successfully been released from the bearing surface.

SUMMARY

To achieve this, the present invention suggests a gripper as it is specified by the features of the independent claim directed to a gripper. Advantageous embodiments of the gripper are the subject of the corresponding dependent claims. In particular, the gripper for a contact lens according to the invention comprises a gripper head having a bearing surface, the bearing surface having at least one opening through which underpressure can be applied in order to suck the contact lens against the bearing surface and through which overpressure can be applied in order to release the contact lens from the bearing surface. The gripper further comprises a detection opening in the bearing surface through which a separate underpressure can be applied.

The separate underpressure which is applicable through the detection opening helps to clearly indicate whether or not a contact lens adheres to the bearing surface. In this connection the term "separate underpressure" means that the separate underpressure applied through the detection opening is neither influenced by the underpressure for sucking the contact lens against the bearing surface nor is it influenced by the overpressure for releasing the contact lens from the bearing surface. In case a separate underpressure of a predetermined value is applied through the detection opening (e.g. with the aid of a vacuum source) and a lens adheres to the bearing surface of the gripper head then this separate underpressure is maintained since the lens adhering to the bearing surface closes the detection opening. In case no lens adheres to the bearing surface, air is sucked in from the environment through the detection opening and this leads to a strong reduction or collapse of the underpressure applied (which will be immediately recognized at the vacuum source providing the underpressure). Thus, reliable detection is possible of whether or not a lens adheres to the bearing surface. In this manner, it is possible to detect whether or not a lens has been successfully sucked against the bearing surface. Also, it is possible to detect whether or not a lens has been successfully released from the bearing surface.

In one embodiment of the gripper according to the invention, the gripper further comprises a vacuum channel being arranged in the interior of the gripper, the distal end of the vacuum channel being arranged in the detection opening in a fluid tight manner so as to allow application of the separate underpressure through the detection opening.

In particular, the vacuum channel may comprise a tube extending through the interior of the gripper with the distal end of the tube being tightly arranged in the detection opening. This is an embodiment which is advantageous from a constructional point of view, since it is a simple and reliable constructional solution how the separate underpressure can be applied through the detection opening in the bearing surface of the gripper head.

In a further embodiment of the gripper according to the invention, the gripper further comprises an underpressure channel leading to the at least one opening in the bearing surface through which underpressure can be applied, as well as an overpressure channel likewise leading to the at least one opening in the bearing surface, the overpressure channel and the underpressure channel being essentially separate from one another. The essentially separate provision of an underpressure channel and of an overpressure channel makes it possible to apply only underpressure or to apply only overpressure, or to apply underpressure and allow a leakage stream to flow through the overpressure channel towards the at least one opening in the bearing surface. The leakage stream assists in transporting away through the underpressure channel any liquid which has been sucked into the interior of the gripper by the application of underpressure through the at least one opening in the bearing surface. The leakage stream is chosen such that it does not essentially affect the underpressure applied through the at least one opening so as to make sure, that the lens remains sucked against the bearing surface despite the leakage stream flowing. In particular, a leaking stream inlet means may be provided for this reason (e.g. a small leakage hole or any other suitable leaking stream inlet means). For example, after a contact lens has been inspected in a liquid such as water contained in a test cell, and the lens is now to be gripped and transported to another location, e.g. to the packaging station, the gripper is to grip (suck) the contact lens from "under water". In doing that, not only the lens is sucked against the bearing surface of the gripper but also water is sucked into the interior of the gripper. In order to entrain as little water as possible into the receptacle where the lens is to be deposited (e.g. into the receptacle of the package containing the saline) the application of underpressure and the simultaneously flowing leakage stream have the effect, that water which has been sucked into the interior of the gripper is transported into the underpressure channel. This helps to further reduce or even completely prevent water being entrained into the receptacle of the package.

In a further embodiment of the gripper according to the invention the underpressure channel comprises a tube extending through the interior of the gripper, the distal end of the tube being arranged at a short distance from the at least one opening in the bearing surface through which the underpressure or the overpressure can be applied. For example, the tube forming the underpressure channel can end at a distance of 0.1 mm to 5 mm, preferably at a distance of about some tenths of a millimeter, for example about 0.2 mm or about 0.3 mm up to about 1 millimeter from the opening or openings in the bearing surface of the gripper head.

In a still further embodiment of the gripper according to the invention the bearing surface is a smooth surface or substantially smooth surface which does not comprise any channels, grooves or the like, where liquid (e.g. water) can collect. As the lens has been sucked against and adheres to the bearing surface, there is no fluid stream flowing in any channels, grooves or the like between the lens and the bearing surface thus preventing the lens from unintentional drying out.

In yet a further embodiment of the gripper according to the invention the outer diameter of the bearing surface is larger than that of the contact lens to be sucked to the bearing surface. Thus, the contact lens sucked against the bearing surface does not extend beyond the outer diameter of the gripper so that upon removal of the gripper from a test cell or from any other container, the lens cannot be damaged in the region of the lens edge.

Another aspect of the present invention is directed to a process for transporting a contact lens from a start location to a destination location, comprising the steps of:
  providing a gripper according to the invention as described above,
  positioning the gripper head with its bearing surface closely adjacent to the contact lens to be transported from the start location to the destination location,
  applying underpressure through the at least one opening in the bearing surface so as to suck the contact lens to adhere to the bearing surface,
  moving the gripper with the contact lens to the destination location,
  applying overpressure through the at least one opening in the bearing surface so as to release the contact lens from the bearing surface at the destination location, and
  applying a separate underpressure through the detection opening in the bearing surface so as to detect whether or not a contact lens is adhered to the bearing surface.

As already mentioned above, the separate underpressure may be applied through the detection opening when the contact lens has been gripped (sucked) and adheres to the bearing surface of the gripper head, or it may be applied after the lens has been released from the bearing surface of the gripper head, or both, so that it is possible to detect whether a lens has been successfully gripped and whether later on it has been successfully released.

In one embodiment of the process according to the invention, the step of applying underpressure through the at least one opening in the bearing surface so as to suck the contact lens to adhere to the bearing surface comprises applying underpressure and at the same time allowing a leakage stream to flow towards the at least one opening in the bearing surface through which the underpressure is applied, with the leakage stream being chosen such that it does not essentially affect the underpressure applied. The advantages of the application of underpressure and at the same time allowing a leakage stream to flow towards the at least one opening in the bearing surface have already been explained above in connection with the corresponding embodiment of the gripper according to the invention (reduction or prevention of entrainment of water).

In a further embodiment of the process according to the invention the step of applying a separate underpressure through the detection opening in the bearing surface is performed after a predetermined time interval of application of underpressure through the at least one opening in the bearing surface. This embodiment of the process is suitable to detect whether a lens has been successfully gripped and adheres to the bearing surface of the gripper head. Also, the predetermined time interval can be chosen such that in case the gripper has gripped the lens in a test cell "under water" the separate underpressure can be applied only after the gripper has been moved out of the test cell so that no water is sucked in through the detection opening.

In a still further embodiment of the process according to the invention the step of applying a separate underpressure through the detection opening in the bearing surface is performed after a predetermined time interval of application of overpressure through the at least one opening in the bearing surface. This embodiment of the process is suitable to detect whether a lens has been successfully released and does no longer adhere to the bearing surface of the gripper head. As has already been mentioned above, this embodiment of the process can be performed either in connection with a process in which also the adherence of the lens to the bearing surface is detected with the aid of the separate underpressure, or it can be performed in connection with a process in which the adherence of the gripped lens to the bearing surface is not detected. Also, the predetermined time interval can be chosen such that under normal conditions the lens has been released at the time the separate underpressure is applied to determine whether or not the lens has indeed been successfully released.

BRIEF DESCRIPTION OF THE DRAWINGS

Further advantageous embodiments of the invention will become apparent from the following description of an embodiment with the aid of the drawings, in which:

In FIG. 1 an embodiment of the gripper 1 according to the invention is shown. Gripper 1 comprises a gripper head 10 having a bearing surface 11 in which there are a plurality of openings 110 through which underpressure can be applied in order to suck a contact lens CL (see FIG. 2) against bearing surface 11 or through which overpressure can be applied in order to release the contact lens from bearing surface 11. In addition, there is a detection opening 111 provided in bearing surface 11 through which a separate underpressure can be applied. Bearing surface 11 is a smooth surface or substantially smooth surface which does not comprise any channels, grooves, or the like so that a contact lens can properly adhere to bearing surface 11 when being sucked against it by underpressure. In the embodiment of gripper 1 shown in FIG. 1 the openings 110 through which the underpressure or overpressure, respectively, can be applied comprise a central opening 110 and a plurality of additional openings 110 arranged along an arc of a circle. However, it is to be noted that this arrangement of the openings 110 in bearing surface 11 is only one example of how the openings 110 can be arranged, they may well be arranged at different locations in bearing surface 11 to serve the same purpose. Bearing surface 11 has an outer diameter 112 which is larger than that of the contact lens, so that once the contact lens adheres to bearing surface 11 it should not get damaged or injured during transport from a start location to a desired destination location, in particular the contact lens should not damaged or injured at the edge of the lens which is the area that is important for the wearing comfort.

Figure 1:
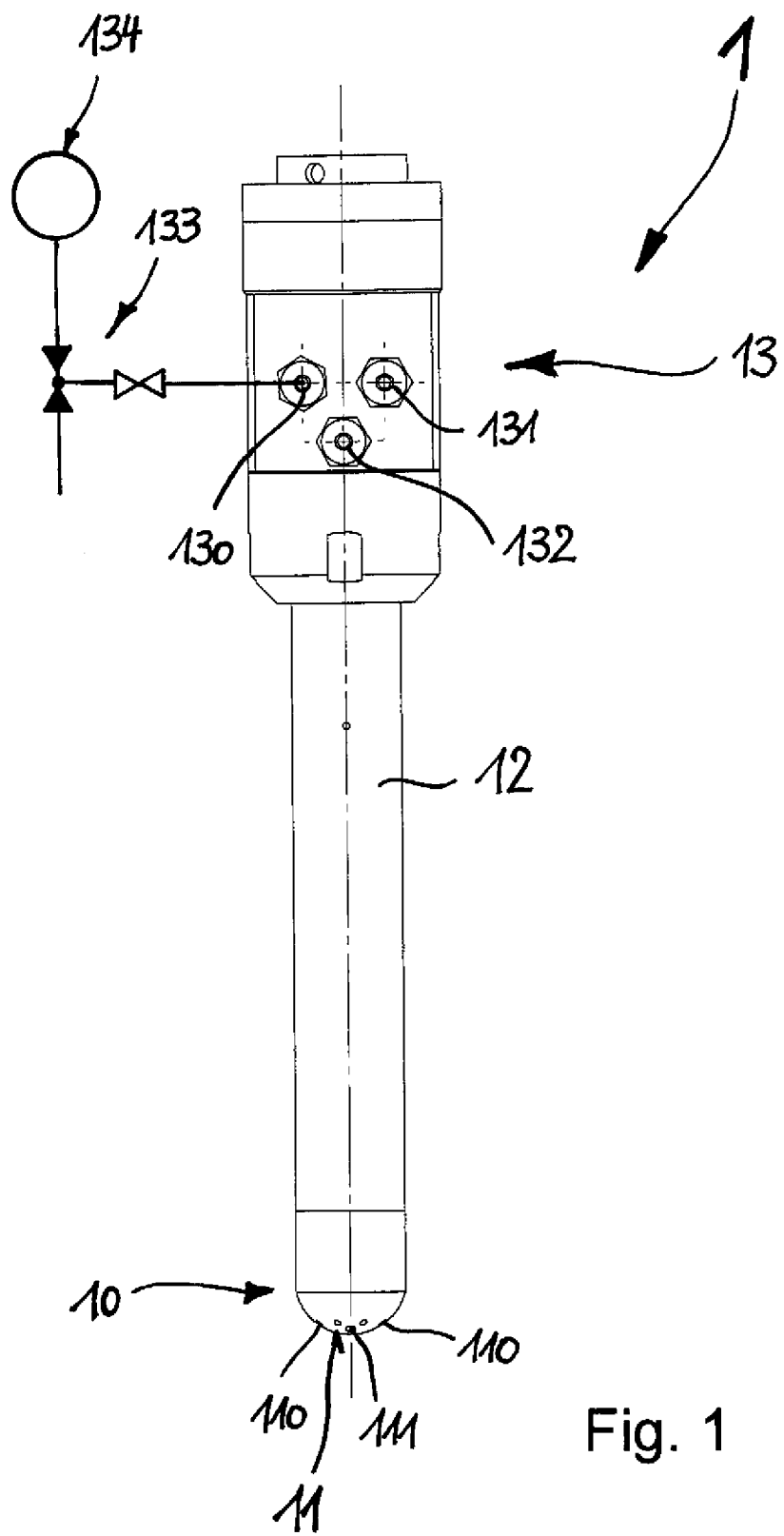
FIG. 1 shows a side view of an embodiment of the gripper according to the invention.

The embodiment of gripper 1 shown in FIG. 1 further comprises a gripper body 12 extending from gripper head 10 to a mounting and supply block 13 having three inlet ports 130,131,132 for accommodating the ends of supply tubes for providing underpressure or overpressure, respectively, as will be explained in detail below. In the embodiment of gripper 1 shown in FIG. 1, inlet port 130 serves to provide overpressure to be applied through the openings 110 provided in bearing surface 11, inlet port 131 serves to provide underpressure to be applied through openings 110, and inlet port 132 serves to provide the separate underpressure to be applied through detection opening 111.

Figure 2:
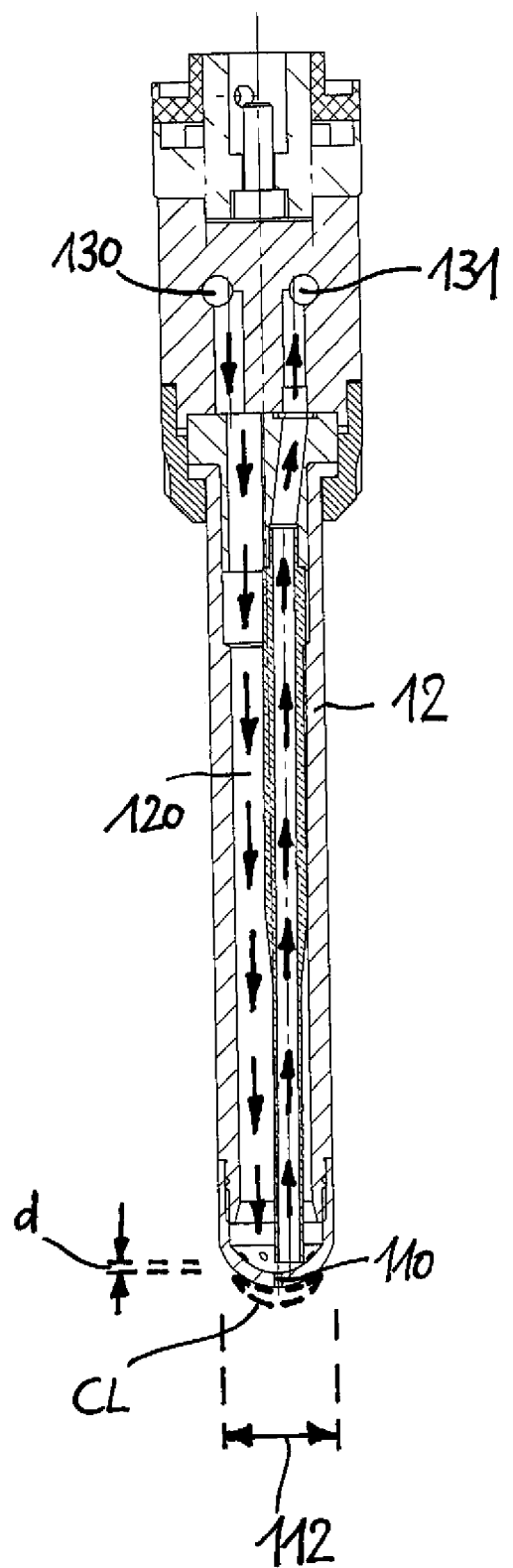
FIG. 2 shows a longitudinal section through the central axis of the gripper of FIG. 1 in a plane running parallel to the plane of the paper on which the drawings are printed.

FIG. 2 shows a longitudinal section through the central axis of the embodiment of gripper 1 shown in FIG. 1 in a plane running parallel to the plane of the paper on which the drawings are printed. As can be seen from FIG. 2, only the central opening of the openings 110 lies in the plane of the longitudinal section while none of the additional openings 110 which are arranged on an arc of a circle (see FIG. 1) lies in the sectional plane of FIG. 2. As can be further seen from FIG. 2, an underpressure channel extends from inlet port 131 down towards gripper head 10 and comprises a tube 14 which extends through the interior 120 of gripper body 12. The distal end 140 of tube 14 is arranged at a short distance d from the openings 110 in bearing surface 11. This short distance d can be in the range of 0.1 mm to 5 mm, and can preferably amount from some tenths of a millimeter, for example about 0.2 mm or about 0.3 mm up to about 1 millimeter from the opening or openings in the bearing surface. The overpressure channel is formed by the interior 120 of gripper body 12 and surrounds tube 14 with the aid of which the underpressure can be applied through the openings 110 arranged in bearing surface 11.

Figure 3:
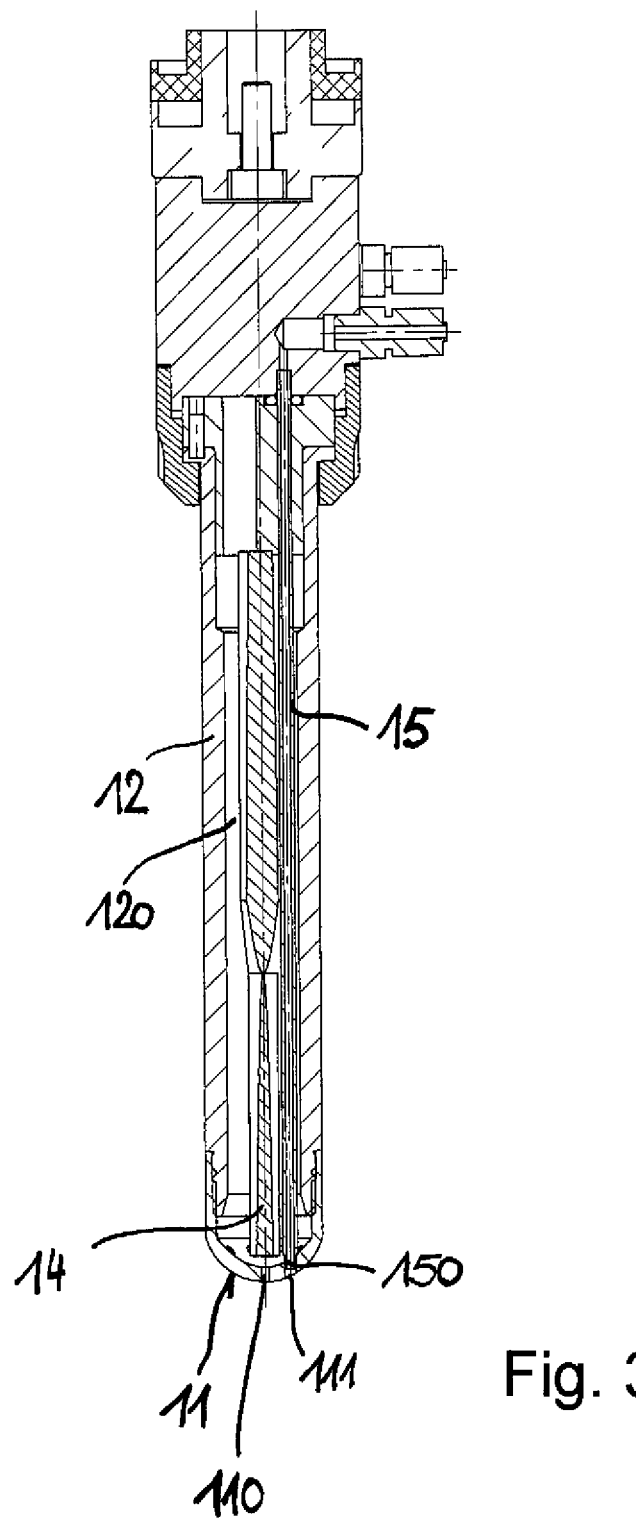
FIG. 3 shows a longitudinal section through the central axis of the gripper of FIG. 1 in a plane running perpendicular to the plane of the paper on which the drawings are printed.

FIG. 3 shows another longitudinal section through the central axis of the gripper of FIG. 1, however, the longitudinal section shown in FIG. 3 runs in a plane which is perpendicular to the sectional plane of FIG. 2. From FIG. 3 it can be seen that there is a separate vacuum channel comprising a tube 15 which has a small diameter and which extends through the interior 120 of gripper body 12. The distal end 150 of tube 15 is fittingly arranged in the detection opening so that there is no fluid communication with the interior 120 of gripper body 12.

Operation of gripper 1 will be explained in the following while referring to an example where a contact lens CL is to be transported from a test cell (start location) where the contact lens is immersed in a liquid, e.g. water, to a packaging station where the lens is to be placed into the receptacle of a package (destination location), into which later on saline is dispensed. This is described, for example, in WO 03/080320 already mentioned further above. The package is subsequently sealed with the aid of a foil or the like. It is to be mentioned, however, that this specific application for gripper 1 is chosen only by way of example, other applications of the gripper are conceivable as well and are considered to be within the scope of the invention.

When gripper 1 is to grip a contact lens CL from the test cell, it is lowered until bearing surface 11 is arranged in close proximity to the contact lens CL to be sucked. Suction is then applied through inlet port 131, tube 14 and finally through openings 110 in bearing surface 11 resulting in water being sucked into the interior 120 of gripper 1. Also, contact lens CL is sucked against bearing surface 11. At the same time a small leakage stream of air may be allowed to enter into the interior 120 of gripper body 12. This leakage stream flows towards the openings 110 in bearing surface 11 and helps to transport water that has been sucked into the interior 120 of gripper 1 away through tube 14 through which the underpressure is applied. In order to allow such leakage stream of air to enter the interior 120 of gripper body 12, any suitable leakage stream inlet means can be provided. By way of example only, the leakage stream inlet means may comprise a valve arrangement 133, which can be actuated in a manner such that either a leakage stream of air may enter through inlet port 130 or an overpressure source 134 is connected to inlet port 130. However, the leakage stream inlet means is in any event embodied such that the leakage stream does not essentially affect the underpressure applied through tube 14 in order to keep the contact lens adhered to bearing surface 11 until gripper 1 has been moved to the destination location where the contact lens CL is to be released. Also, it is conceivable to apply underpressure only during an initial phase until gripper 1 with the contact lens adhered to bearing surface 11 has been moved out of the water contained in the test cell and only then the leakage stream inlet means (valve arrangement 133) allows the leakage stream of air to enter the interior 120 of gripper body 12, so that water that has been sucked into the interior 120 of gripper body 12 can be transported away through tube 14 more efficiently. An additional advantage achieved through the leakage flow generated in the interior 120 of the gripper body 12 (in contrast to WO 03/080320 where the underpressure occurs through grooves provided in the bearing surface) is that an unwanted drying of the contact lens in particular in the region of the lens edge is avoided.

During the transport of the contact lens CL, that is to say a predetermined time interval after the lens has been taken out of the test cell, a separate underpressure can be applied through inlet port 132 and through tube 15 the distal end 150 of which is fittingly arranged in detection opening 111 so that there is no fluid communication between the distal end 150 of tube 15 and the interior 120 of gripper body 12. The separate underpressure applied through detection opening 111 functions as an indicator of whether or not a contact lens CL adheres to bearing surface 11. When the separate underpressure is applied through detection opening 111 and a contact lens CL adheres to bearing surface 11 the contact lens CL closes the detection opening 111 and, accordingly, the applied underpressure is maintained. This indicates that the contact lens CL has been successfully gripped and adheres against bearing surface 11.

As gripper 11 reaches its destination location, in the example described above the position above the receptacle of the package where the contact lens is to be placed into, application of underpressure is discontinued. Application of overpressure, however, is continued so that as a result overpressure is now applied through openings 110 in bearing surface 11. Thus, contact lens CL is released from bearing surface 11 and is placed into the receptacle of the package (destination location).

While not being mandatory, the simultaneous application of both underpressure and overpressure at least for some time reduces or even completely eliminates the amount of water which can otherwise be entrained into the receptacle of the package by having been sucked into the interior 120 of gripper body 12, where it may have accumulated and may not have been transported away completely. Thus, it is prevented that such small amounts are drained into the receptacle when releasing the contact lens from bearing surface 11.

Once the contact lens CL has been placed into the receptacle, the gripper is returned to its start position for gripping the next contact lens. On its way back to the start position, it is again possible to apply the separate underpressure through inlet port 132, tube 15 and detection opening 111. This is done in order to detect, whether the contact lens has been successfully released from bearing surface 11 so that gripper 1 is capable of gripping the next contact lens. If the contact lens CL has been properly released the underpressure applied through detection opening 111 is strongly reduced or collapses which is an indication that the contact lens CL has been properly released. Gripper 1 is then ready for gripping the next contact lens. Otherwise, corrective action must be taken (e.g. either gripper 11 must be returned to the destination position so as to try to release the contact lens again, or the contact lens must be released from the bearing surface and must be disposed of).

It is conceivable to apply the separate underpressure only during the transport of the contact lens CL from the test cell (start position) to the receptacle of the package (destination position) or only after the application of overpressure only, i.e. when the gripper is moved back to its start position, or both, so that it is possible to detect whether the contact lens has been successfully gripped or to monitor whether the contact lens has been successfully released, or both.

The application of a separate underpressure through detection opening 111 is performed since the underpressure applied through tube 14 varies to an extent which is too large to detect with sufficient reliability whether or not a contact lens adheres to bearing surface 11. Through the application of a separate underpressure this can be reliably detected.

Although the invention has been described with the aid of a specific embodiment, it is evident to the person skilled in the art that this embodiment has only been described by way of example, and that various changes and modifications are conceivable without departing from the teaching underlying the invention. Therefore, the invention is not intended to be limited by the embodiment described, but rather is defined by the appended claims.

The invention claimed is:

1. A gripper for a contact lens comprising a gripper head having a bearing surface, the bearing surface having at least one opening through which underpressure can be applied in order to suck the contact lens against the bearing surface and through which overpressure can be applied in order to release the contact lens from the bearing surface, the gripper further comprising a detection opening in the bearing surface through which a separate underpressure can be applied.

2. The gripper according to claim 1, further comprising a vacuum channel being arranged in the interior of the gripper, the distal end of the vacuum channel being arranged in the detection opening in a fluid-tight manner so as to allow application of the separate underpressure through the detection opening.

3. The gripper according to claim 2, wherein the vacuum channel comprises a tube extending through the interior of the gripper with the distal end of the tube being arranged in fluid-tight manner in the detection opening.

4. The gripper according to claim 3, further comprising an underpressure channel leading to the at least one opening in the bearing surface through which underpressure can be applied, as well as an overpressure channel likewise leading to the at least one opening in the bearing surface, the overpressure channel and the underpressure channel being essentially separate from one another.

5. The gripper according to claim 4, wherein the underpressure channel comprises a tube extending through the interior of the gripper, the distal end of the tube being arranged at a short distance (d) from the at least one opening in the bearing surface through which the underpressure or the overpressure can be applied.

6. The gripper according to claim 4, further comprising a leakage stream inlet means to allow a leakage stream to flow through the overpressure channel towards the at least one opening in the bearing surface through which the underpressure is applied.

7. The gripper according to claim 5, further comprising a leakage stream inlet means to allow a leakage stream to flow through the overpressure channel towards the at least one opening in the bearing surface through which the underpressure is applied.

8. The gripper according to claim 1, wherein the bearing surface is a smooth surface which does not comprise any channels, grooves or the like.

9. The gripper according to claim 4, wherein the bearing surface is a smooth surface which does not comprise any channels, grooves or the like.

10. The gripper according to claim 1, wherein the outer diameter of the bearing surface is larger than that of the contact lens to be sucked to the bearing surface.

11. The gripper according to claim 4, wherein the outer diameter of the bearing surface is larger than that of the contact lens to be sucked to the bearing surface.

* * * * *